Patented Jan. 19, 1932

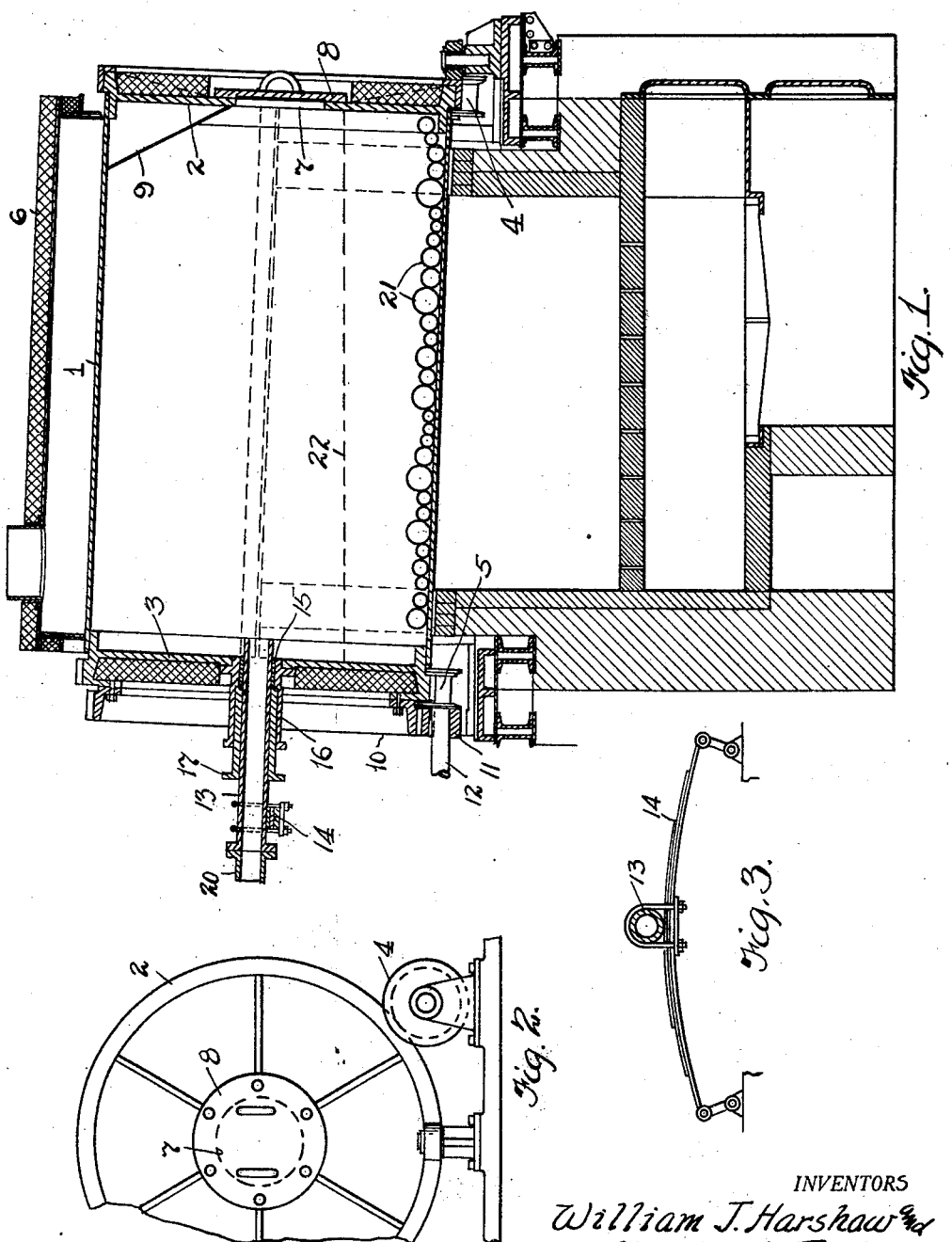

1,842,092

UNITED STATES PATENT OFFICE

WILLIAM J. HARSHAW, OF SHAKER HEIGHTS VILLAGE, AND CHARLES S. PARKE, OF CLEVELAND, OHIO, ASSIGNORS TO THE HARSHAW CHEMICAL COMPANY, OF CLEVELAND, OHIO, A CORPORATION OF OHIO

APPARATUS FOR MAKING HYDROFLUORIC ACID

Original application filed February 19, 1925, Serial No. 10,261, now Patent No. 1,665,588. Divided and this application filed February 4, 1928. Serial No. 251,777.

It has long been known that when fluorspar (calcium fluoride, $CaF_2$) is caused to react with sulphuric acid, $H_2SO_4$, hydrofluoric acid gas, HF, will be given off, leaving a residue of calcium sulphate, $CaSO_4$, the reaction being expressed by the equation:—

$$CaF_2 + H_2SO_4 = CaSO_4 + 2HF.$$

The original method for commercially making hydrofluoric acid by the foregoing process, and one still used to a considerable extent, consists in the use of pots or pans which are filled with fluorspar, sulphuric acid being added and thoroughly intermixed with such fluorspar, following which the cover is securely bolted or otherwise fastened to the pot or pan and heat then applied to the latter. The evolved hydrofluoric acid gas is led off to a suitable absorber or condenser and at the conclusion of the operation, which requires a number of hours, the cover is removed from the pot or pan and the residue, which is in the form of a hard solid mass, is removed preparatory to the introduction of a fresh charge.

In the so-called Naugatuck process, provision is made for the agitation of the materials in a potstill of the character just described so as to stir and break up the mass during the heating operation.

In place of a potstill, it has also been proposed to employ a stationary covered trough that constitutes in effect an elongated still, such trough being slightly inclined and a revolving shaft provided with radial arms extending lengthwise thereof, whereby the material introduced at one end is continuously stirred and intermixed and at the same time carried gradually towards the other end. The trough is of course suitably heated so that the material in its passage therethrough may be brought to the reacting temperature. This last described process is a continuous one in contradistinction to the potstill operation and as an obvious adaptation of such process, it has also been proposed to use an inclined revolving still of familiar type through which the material is continuously passed, such material being agitated incidentally to the rotation of the still.

All of the foregoing methods have certain serious objections among which may be named the necessity that the fluorspar be of a relatively high degree of purity, e. g. the so-called acid grade must run at a content of 98 per cent. of calcium fluoride and not more than 1 per cent. of silica or of carbonate of lime. It is also necessary to the successful operation of any of the foregoing processes that the fluorspar be very finely ground, if the reaction is to be carried through with any degree of completeness, it being noted that the agitation provided for in certain of the processes referred to above has merely as its object to break up the mass of the reacting materials and avoid the formation of the hard cake by the calcium sulphate produced as a result of the reaction. Not only is the fine grinding of the fluorspar an expensive operation, because of the hardness of the material, but when such finely ground material is brought in contact with the sulphuric acid, unless the application of the heat be carefully regulated, even the small percentage of carbonate of lime present in acid grade material will result in excessive generation of carbon dioxide during the inital stage of the operation.

We have discovered that most, if not all, of the foregoing difficulties can be successfully overcome by the utilization in a suitably designed apparatus of unground fluorspar, i. e. raw material that has been simply crushed to fragments measuring from one-half inch or even three-fourths inch in size down, if provision be made for comminuting the raw material in this form while the reaction progresses. This comminution we have found can be satisfactorily obtained in a retort on the order of a ball mill in which iron balls of suitable size, or their equivalent, are introduced along with the crushed material so that as the retort is rotated, a grinding action will result. In other words, as fast as the sulphuric acid attacks the fluorspar, the coating of calcium sulphate is rubbed off and the reaction thus allowed to continue until the material is entirely used up. All tendency to cake is obviously avoided and at the same time it becomes possible to use relatively impure fluorspar, such as the grade known as fluxing spar in which the carbonate of lime runs as high as 10 per cent.; this for the reason that the acid can react only gradually on the carbonate thus present, i. e. as the fragments of the spar are reduced in size by the grinding action, and there is accordingly at no time any dangerous excess of carbon dioxide given off.

To the accomplishment of the foregoing and related ends, the invention, then, consists of the steps and means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:—

Fig. 1 is a longitudinal axial section of a retort designed for carrying out our present improved method or process; Fig. 2 is a broken front elevation of such retort, viewing the same as from the right in Fig. 1; and Fig. 3 is partly a transverse section and partly an elevation of the eduction or gas discharge pipe and the special support provided therefor.

As indicated above, in general the construction of our improved retort follows the lines of the ordinary ball mill. Thus, as shown in Fig. 1, it consists of a cylindrical shell 1 suitably closed by heads 2 and 3 at its respective ends. These heads rest on rollers 4 and 5, respectively, which are so disposed as to support the retort in an inclined position within the furnace chamber 6.

The head 2 at the lower end of the retort is provided with a manhole 7 to which is fitted a removable cover 8, so that a batch of fresh material can be introduced into the retort through such opening when desired and subsequently removed when spent. To facilitate such removal, a series of radial fins or lifting plates 9 is secured in the corner of the retort between head 2 and cylindrical wall 1 adjacent opening 7, so that when the cover is removed and a trough or scoop inserted through such opening, the material will be raised by these plates and dropped onto such trough until the retort is substantially empty.

For the purpose of rotating the retort, an annular gear 10 is attached to the other head 3, such gear meshing with a pinion 11 on a drive shaft 12, as need not be further explained.

The gases generated during the operation of the retort are also removed through an eduction pipe 13 that extends through a central opening in said head 3 so as to project a short distance within the retort. Owing to the highly corrosive character of hydrofluoric acid gas, it is necessary that the joint between the pipe and the head 3 be very carefully sealed. We have found that much more satisfactory results are obtainable by journaling said pipe in the head than by fixing the pipe to the latter in the form of a hollow trunnion for it is practically impossible in a retort of any size to so mount the same on its roller supports as not to subject this pipe to a certain amount of weaving action. The exteriorly projecting portion of the pipe is accordingly resiliently supported as by means of a transversely disposed leaf spring 14 secured at its midpoint thereto and mounted on pivot shackles, as shown in Fig. 3; while the inner end of the pipe is journaled in a bronze bushing 15, fitted in the central opening in head 3, and is surrounded for some distance beyond the outer face of the head with a stuffing box 16 and stuffing gland 17. This gland serves to retain in the stuffing box and around the enclosed portion of the pipe a suitable body of lubricating material which constitutes an effective seal against the escape of gas and at the same time, by virtue of the flexible support provided for the pipe, no special wear is imposed on the gland or bushing 15, the spring mounting allowing slight movement in various directions and thus the pipe being free to accommodate itself to any slight shifting movement produced by the rotation of the retort. The outer end of the pipe is flanged to permit its connection with an extension 20 that leads to a suitable condenser or absorber, (not shown).

In utilizing the foregoing retort, as previously indicated, we introduce along with the raw material, consisting of crushed fluorspar, a quantity of iron balls 21 or irregular pieces or scraps of iron, since the shape of these is not important as affecting the results we obtain, although balls are preferable since they are less wearing on the walls of the retort. As previously indicated, the fluorspar need not be ground but merely crushed and fragments as large as one-half inch or three-fourths inch are not objectionable. The size of the iron balls may similarly vary widely, e. g. from one inch to five inches in diameter. A batch of the crushed fluorspar is simply shoveled through opening 7 until a layer of desired thickness, for instance as indicated by dotted line 22 in Fig. 1 is formed, and then a charge of sulphuric acid, equivalent to the fluorspar, is run into the retort, it being understood that the iron balls will be introduced at the same time. Thereupon the cover 8 is replaced and the retort slowly revolved while its temperature is slowly raised by proper control of furnace 6.

While the action of the iron balls in directly reducing the original fluorspar fragments is practically nil due to the hardness of the fluorspar, the layer of calcium sulphate that is formed in such fragments by the reaction of the sulphuric acid therewith, is relatively soft and is easily rubbed off. Fresh surfaces are being thus constantly exposed to the action of the acid and the operation is brought to a stage of completion simultaneously with the final reduction of these fragments. Thereupon the spent residue is removed in the manner already described and a fresh batch of crushed fluorspar with the proper amount of acid is introduced into the retort.

While the operation, as just noted, is discontinuous with a consequent variation in the rate at which the hydrofluoric acid gas is generated, the advantages obtained considerably outweigh any disadvantage that might be thought to attach to such discontinuous operation. Not only may a less expensive grade of fluorspar be utilized, but the preparation of such material by omitting the difficult grinding thereof is very much less costly. At the same time a relatively smaller condenser for the hydrofluoric acid gas will suffice than with the ordinary potstill, for example, since even at the initial stage of the operation there is no such excessive generation of the gas as when finely ground material after being intermixed with the sulphuric acid is brought to the reacting temperature. Moreover, the carbon dioxide gas that results from the reaction of such acid with the calcium carbonate present is likewise given off slowly and any tendency for the mixture to foam is avoided.

By utilizing a fluxing spar with a high enough content of silica or by purposely adding silica in the form of sand, or equivalent siliceous material capable of reacting with the acids present, we may make fluosilicic acid, $H_2SiF_6$, directly instead of hydrofluoric acid.

This application is a division of our application Serial Number 10,261, filed February 19, 1925, (Patent No. 1,665,588, April 10, 1928).

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:—

1. The combination of a rotary retort; an eduction tube approximately central in one end of said retort; and means for supporting said tube externally, said means being yieldable in various directions.

2. The combination of a rotary retort; an eduction tube journalled approximately centrally in one end of said retort; a stuffing box surrounding said tube where it enters said retort end; and resilient means yieldable in various directions for supporting said tube.

3. The combination of a rotary retort; an eduction tube journaled approximately centrally in one end of said retort; a stuffing box on the tube; and a spring yieldable in various directions for supporting said tube.

4. The combination of a rotary retort; an eduction tube journaled approximately centrally in one end of said retort; a stuffing box surrounding said tube where it enters said retort end; and a transversely disposed, leaf spring connected with the outer portion of said tube and forming a resilient support therefor.

5. The combination of a rotary retort; an eduction tube journaled approximately centrally in one end of said retort; and a transversely disposed leaf spring supporting at its midpoint said tube and being in turn supported at its ends.

6. The combination of a rotary retort; a heating chamber thereabout; means at one end of said retort for discharging gaseous products, said means including an eduction tube journalled approximately centrally in one end of said retort; a stuffing box surrounding said tube where it enters said retort end; means yieldable in various directions for externally supporting said tube; and means for discharging solid products from the other end of the retort, said means including a discharge opening of less area than such retort end, and a series of radial fins about such opening.

Signed by us this 26th day of January, 1928.

WILLIAM J. HARSHAW.
CHARLES S. PARKE.